Inventors:
Wolfgang Pabst
Peter Brembs
By: Spencer & Kaye
Attorneys

United States Patent Office 3,565,524
Patented Feb. 23, 1971

3,565,524
PHOTODRAWING HEAD WITH SYMBOLS FOR EXPOSING TO LIGHT A PHOTOSENSITIVE DRAWING SURFACE
Wolfgang Pabst, New-Isenburg, and Peter Brembs, Heussenstamm, Germany, assignors to Licentia Patent-Verwaltungs-G.m.b.H., Frankfurt, Germany
Filed Apr. 9, 1969, Ser. No. 814,577
Claims priority, application Germany, Apr. 10, 1968, P 17 61 170.0
Int. Cl. G03b 27/00
U.S. Cl. 355—1
7 Claims

ABSTRACT OF THE DISCLOSURE

A photographic drawing system includes a photosensitive drawing surface, projector means for projecting symbols into the surface, and means for moving the projected symbols and the surface relative to each other. The projector means include a plurality of light conducting fibers serving as an optical connector means, a first projector device for projecting light onto the inputs of all of the light fibers, a second projector device for receiving light from the outputs of all of the optical fibers and for utilizing the light to project the symbols onto the drawing surface, and means for controlling the number of optical fibers through which light will be passed in order to thereby control the intensity of light projected onto the drawing surface.

BACKGROUND OF THE INVENTION

This invention relates to photographic drawing systems, and more particularly to a system for controlling the intensity of light projected onto a photosensitive drawing surface to compensate for variations in the speed at which the projected symbol is moved relative to the photosensitive surface, and for other factors affecting intensity of the projected image.

In the copending application of applicant Pabst Ser. No. 774,996, filed Nov. 12, 1968, and of common ownership with the present application, there is disclosed a photographic drawing head including means for projecting a selected one of a plurality of symbols onto a photosensitive surface. The symbols are provided on an exchangeable transparent disc which is illuminated by a light surface.

This drawing head is particularly suited for producing drawings containing lines. The symbols include a plurality of points having different diameters. A relative movement between the drawing head and the photosensitive surface results in the production of a visible line on the surface whose width varies with the width of the point. When an appropriate control system is employed to control the movement of the drawing head and the photosensitive surface a great variety of line patterns may be drawn on the photosensitive surface. Such patterns are useful as drawings or working paterns, particularly for the production of conductive printed circuits.

Production of satisfactory drawings on the photosensitive surface requires that the illumination intensity of the projected point of light must vary in accordacne with the speed at which the head and drawing surface move relative to each other. The higher the speed, the stronger must be the light intensity of the point of light since with increasing speed the effective exposure time of the light on the drawing surface is lessened. If the speed of relative movement between head and surface decreases, the effective exposure time becomes greater and the illumination intensity must be appropriately reduced.

In principle it should be possible to vary the light intensity by simply varying the supply voltage of the light source in accordance with the speed of relative movement. Unfortunately due to the heat capacity of the light filaments of the lamp the light intensity can not be varied within a short enough period of time. Modern drawing machines are provided with drives having very high acceleration rates. This makes it necessary that the light intensity be variable from zero to the maximum within an increment of approximately 10 milliseconds. Wedge filter mechanisms whose position can be varied between the light source and a condenser lens have been suggested, but these have too much mass and moment of inertia, and are unable to vary the light intensity within the required time interval. For the same reasons controlled iris diaphragms have also been unable to be varied quickly enough.

In such automatic drawing systems the changes in condition of the drawing head relative to the drawing surface is under the control of a given program which predetermines the speed at which the drawing process will be performed. The light intensity of the light source, or respectively the illumination intensity in the image plane of the drawing surface must be proportional to the speed at any moment.

SUMMARY OF THE INVENTION

Among the objects of the present invention are the provision of a photodrawing head having a brightness control which permits the variation of light intensity within a very short period of time.

Briefly stated this and other objects of the invention are accomplished by providing a projector assembly means including first and second projector means, connected by plurality of optical fiber connectors. A first projector portion may project light onto the inputs of all of the light fibers, and a second projector portion may receive light from the outputs of all of the fibers and utilize the light to project the symbols onto the drawing surface. The number of optical fibers through which light passes may be controlled to thereby vary the intensity of light projected onto the drawing surface.

DESCRIPTION OF THE PREFERRED EMBODIMENTS

Figure 1:
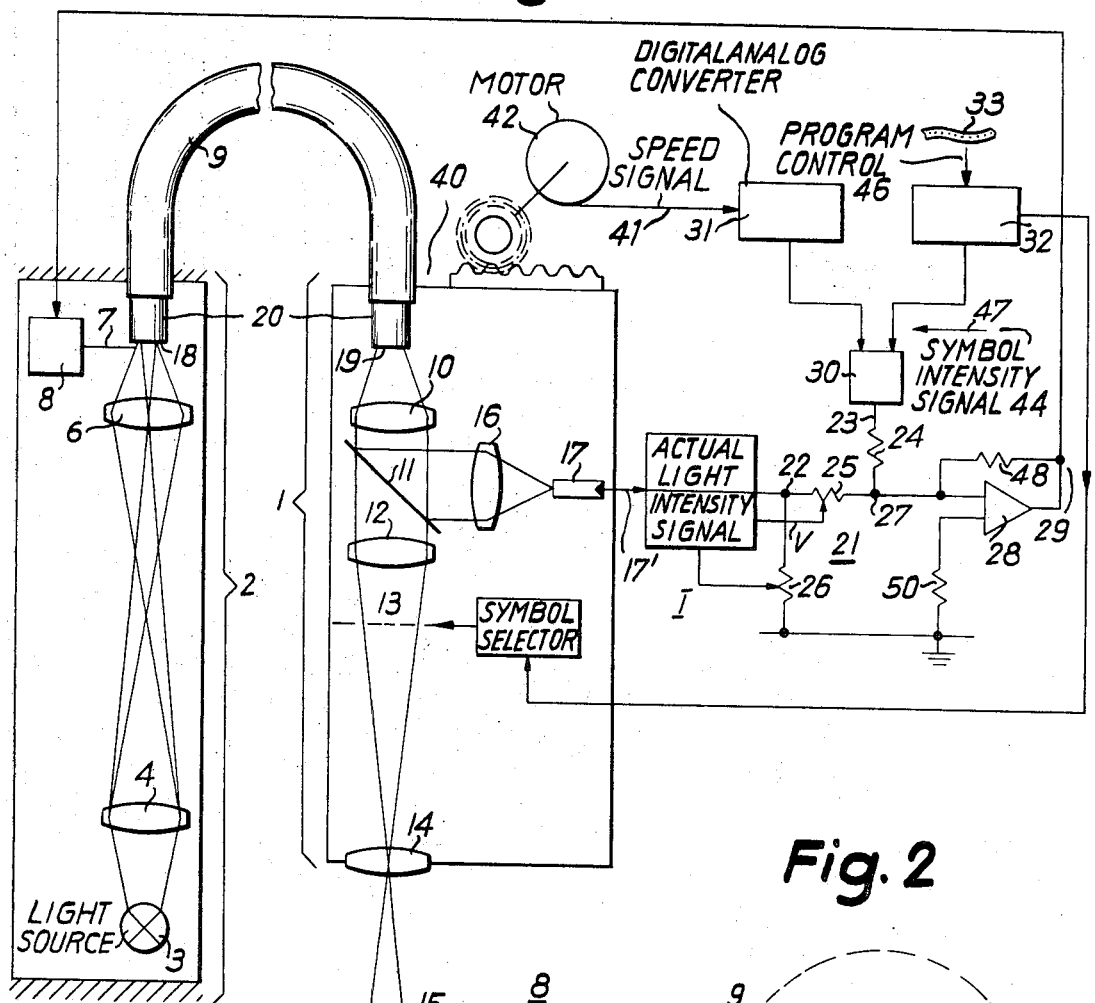
FIG. 1 is a schematic drawing illustrating a preferred embodiment of the invention.

Referring now to FIG. 1 a photographic drawing system according to the present invention includes a movably mounted drawing head 40 having a first projection device 1 mounted therein, which receives light from a flexible optical light fiber conductor 9, which in turn receives the light from a second projection device 2.

Projection device 2 includes a light source 3 which directs light through a condenser lens 4, a second lens 6, and through the path of movement of a movable light blocking member 7 which is moved by a drive system 8. Such light as is permitted to pass by light blocking member 7 falls onto the input 18 of the light conductor 9.

In the illustrated embodiment nine light fibers 9a–9i are connected in a rectangular pattern at the input end 18 of the conductor and in a circular pattern at its output end 19. Between these ends they are arbitrarily arranged. The fibers 9a, 9b, 9c are positioned at one side of the rectangular bundle at input end 18 so that they will be initially covered by the first movement of light blocking member 7 into the light path. However, at the output end 19 fibers 9a, 9b, and 9c are uniformly distributed around the circle. Similarly fibers 9d, 9e, and 9f which are next covered by light blocking member 7 at the input end are also uniformly distributed at the output as are the fibers 9g, 9h, and 9i which are the last covered fibers. As a result even when some fibers are covered by the light blocking member 7 a uniform light distribution from the connector end 19 occurs.

Within projector device 1 light received from fiber connector output 19 is delivered to a condenser lens 10 and through a partially transparent mirror 11 which reflects a portion of the light for control purposes will hereafter be explained in detail. Light passing through semi-transparent plate 11, passes through a second lens 12, through a symbol disc 13, a third lens 14, and is thence projected onto a photosensitive drawing surface 15.

Light reflected by semi-transparent mirror 11 is directed through a lens 16 onto a photodiode 17. Photodiode 17 passes a signal whose strength is proportional to the intensity of the light projected onto its photosensitive surface 15. This light intensity signal passes through a summing circuit 21 including evaluation resistors 24, 25 and 26 and is delivered to a summing point 27.

Signals representing desired light intensity are also delivered to summing point 27 from a coupling circuit 30.

One of the inputs to coupling circuit 30 originates with a speed signal 41 whose intensity varies with the speed of the drawing head drive motor 42. Speed signal 41 is delivered to a digital-to-analog converter 31 and thence to coupling circuit 30.

The other input to coupling circuit 30 is a signal emitted by program control 32, which is under the control of a program carrier 33. Program control 32 controls the symbol selector 13 and delivers a symbol light intensity signal 44, this relationship being shown schematically by arrows 46, 47 respectively. This signal is proportional in intensity to the light penetration of the symbol selected for use at symbol holder 13. Coupling circuit 30 adds the signals received from converter 31 and program control 32 and delivers a signal to evaluation resistor 24 and to summing point 27 which is representative of the desired light intensity. This is delivered to evaluaton resistor 24 and thence to the summing point 27. At the same time there is received at summing point 27 a signal representative of actual light intensity. This comes from evaluation resistor 25 which receives a signal representative of the voltage of the output of photodiode 17, and from resistor 26, which is an evaluation resistor for the current of photodiode signal 17. The signal thus represents the actual light intensity of the light delivered from the output end 19 of the light connecing fiber 9. The signal delivered from summing poin 27 thus represents the difference between actual and desired intensity. This signal is amplified by amplifier 28, whose output 29 is connected to the drive system 8 operating the light blocking member 7.

Information on the construction and use of the photo diode is given in the handbook "The application of linear microcircuits" issued 1966 by SGS-Fairchild. The coupling circuit may be an operational amplifier. The digital-analog-converter is well-known and described in Electronics Design, July 5, 1967, pp. 68-71. For instance, as the drive mechanism for the drawing head may be used such one as described in the article "Numerische Steuerung and Messung bei Koordinatographen," published in the August 1964 issue of the AEG-Mitteilungen, pp. 376-381. The amplifiers 28, 30 are well-known operational amplifiers described in the above mentioned handbook. Resistor 48 is a feedback resistor and resistor 50 is an operating bias resistor.

Figure 2:
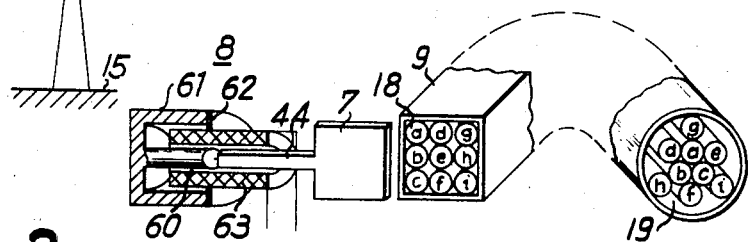
FIG. 2 is a perspective of a light fiber bundle according to the present invention, and a means for obscuring selected light fibers, a portion of the elements being broken away and some elements being shown schematically.

FIG. 2 shows a magnet system 8 having a ring shaped air gap 60. Numeral 61 denotes a tubular-shaped permanent magnet. An elastic membrane 62 which is supported by the magnet carries a coil 63 extending into the air gap 60 of the magnet system. Attached to the coil 63 is the light blocking member 7. With electric current flowing through coil 63 according the blocking member 7 will be moved.

The light blocking member 7 may be a lug. Light blocking member 7 covers the light input of the light conductor 19 to a greater or lesser extent and depending on the strength of the signal delivered to system 8 covers a desired number of light fibers 9a–i.

Figure 3:
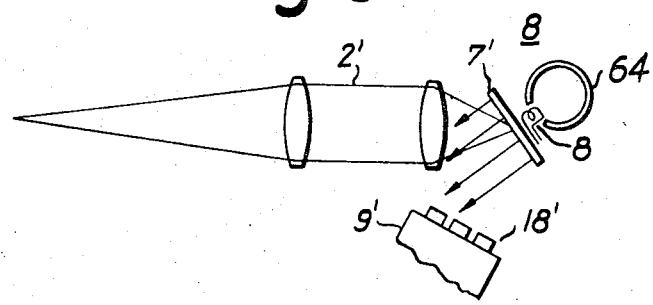
FIG. 3 illustrates a different embodiment of the means for projecting light onto selected light fibers.

Referring to FIG. 3 the light controlling means may also be a mirror 7' which is angularly rotated by a moving coil 8 of a D'Arsonval meter 8' which directs a greater or lesser amount of the light output of projector 2' into the input ends of the input end 18' of a fiber connector 9'. 64 is the magnet of the meter. Corresponding elements of the FIG. 3 embodiment of the invention have reference numerals corresponding to corresponding elements of the FIGS. 1–2 embodiment.

The control of the light blocking member 7 requires not absolute a closed loop control but it may be used as an open loop control. For instance, control of the intensity of light may be performed with a digitalized drive system in form of a step motor with a light blocking member 7.

It will be understood that the above description of the present invention is susceptible to various modifications, changes and adaptations.

What is claimed is:

1. A photographic drawing system comprising, in combination:
 (a) a photosensitive drawing surface;
 (b) drawing head means including projector means for projecting symbols onto said surface;
 (c) means for moving the projected symbols and said surface relative to each other;
 (d) said projector means including
  (1) optical fiber connector means including a plurality of light-conducting fibers;
  (2) a first projector device for projecting light onto the inputs of all of said light fibers;
  (3) a second projector device for receiving light from the outputs of all of said optical fibers and for utilizing said light to project symbols onto said drawing surface; and
  (4) means for controlling the number of optical fibers through which light will be passed in order to thereby control the intensity of light projected onto the drawing surface.

2. The combination defined in claim 1 wherein said means for controlling the number of optical fibers through which light passes includes:
 (a) means for deriving a signal whose intensity varies with variations of the intensity of the light projected by said second projector portion,
 (b) means for deriving a speed signal which varies with the speed of movement of said projected symbol,
 (c) means for comparing said light intensity and speed signals and for deriving a deviation signal therefrom, and
 (d) means utilizing said deviation signal for controlling the number of optical fibers through which light will pass.

3. The combination defined in claim 2 including means for varying the symbol which will be projected by said second projector device, means for deriving a signal whose intensity varies with the intensity of light projected through the selected symbol, said means for deriving the deviation signal including means for comparing said light intensity signal with said symbol intensity signal as well as said speed signal.

4. The combination defined in claim 1 wherein said means for moving said projected symbol includes support structure, means mounting the drawing head for movement relative to said support structure and said photosensitive surface, said second projector device being mounted on drawing head, and said first projector device being mounted on said support structure.

5. The combination defined in claim 1 wherein said plurality of light conducting fibers are arranged in a rectangular pattern at their input end and a circular pattern at their output end.

6. The combination defined in claim 1 wherein said means for controlling the number of optical fibers through which light will be passed includes a light blocking member, and means for moving said light blocking member between said first projector device, and the inputs of selected optical fibers.

7. The combination defined in claim 1 wherein the means for controlling the number of optical fibers through which light will be passed includes mirror means, and means for moving said mirror means to selectively direct light from said first projector portion onto the inputs of selected fibers.

References Cited

UNITED STATES PATENTS

| | | | |
|---|---|---|---|
| 2,787,654 | 4/1957 | Peery | 178—15X |
| 3,330,182 | 7/1967 | Gerber et al. | 95—1 |
| 3,464,330 | 9/1969 | Lewis | 95—1 |

JOHN M. HORAN, Primary Examiner

D. J. CLEMENT, Assistant Examiner

U.S. Cl. X.R.

95—1; 350—96; 355—67